No. 763,329. PATENTED JUNE 21, 1904.
B. S. ROWNTREE.
SHAKING MACHINE.
APPLICATION FILED OCT. 5, 1903.
NO MODEL. 3 SHEETS—SHEET 1.

Witnesses,
M. Virginia Thompson.
Albert Popkins

Inventor
B. S. Rowntree
By
Sturtevant & Greeley
attys

No. 763,329. PATENTED JUNE 21, 1904.
B. S. ROWNTREE.
SHAKING MACHINE.
APPLICATION FILED OCT. 5, 1903.
NO MODEL. 3 SHEETS—SHEET 2.

Witnesses. Inventor
M. Virginia Thompson. B. S. Rowntree
Albert Popkins By
Sturtevant & Greeley
Attys No. 763,329. Patented June 21, 1904.

UNITED STATES PATENT OFFICE.

BENJAMIN SEEBOHM ROWNTREE, OF YORK, ENGLAND.

SHAKING-MACHINE.

SPECIFICATION forming part of Letters Patent No. 763,329, dated June 21, 1904.

Application filed October 5, 1903. Serial No. 175,855. (No model.)

*To all whom it may concern:*

Be it known that I, BENJAMIN SEEBOHM ROWNTREE, a subject of the King of Great Britain, residing at York, in the county of York, England, (whose post-office address is The Cocoa Works, York, aforesaid,) have invented certain new and useful Improvements in Shaking-Machines, (for which application has been made in Great Britain, No. 3,748, dated February 17, 1903,) of which the following is a specification.

This invention has for its object a shaking-machine applicable for shaking chocolate into molds and other like purposes. Machines of this kind hitherto have been liable to very serious defects. First, they are most of them extremely noisy; secondly, the small loose pieces of chocolate have nowhere to go and are thrown up against the chocolate settling in the molds and stick thereto, making them look unsightly.

Now by my invention I obtain an almost noiseless machine, and all the loose pieces of chocolate which would otherwise make unsightly the material settling in the molds are carried away for further utilization, while at the same time the power required and wear and tear on the machine are reduced.

Figure 1:
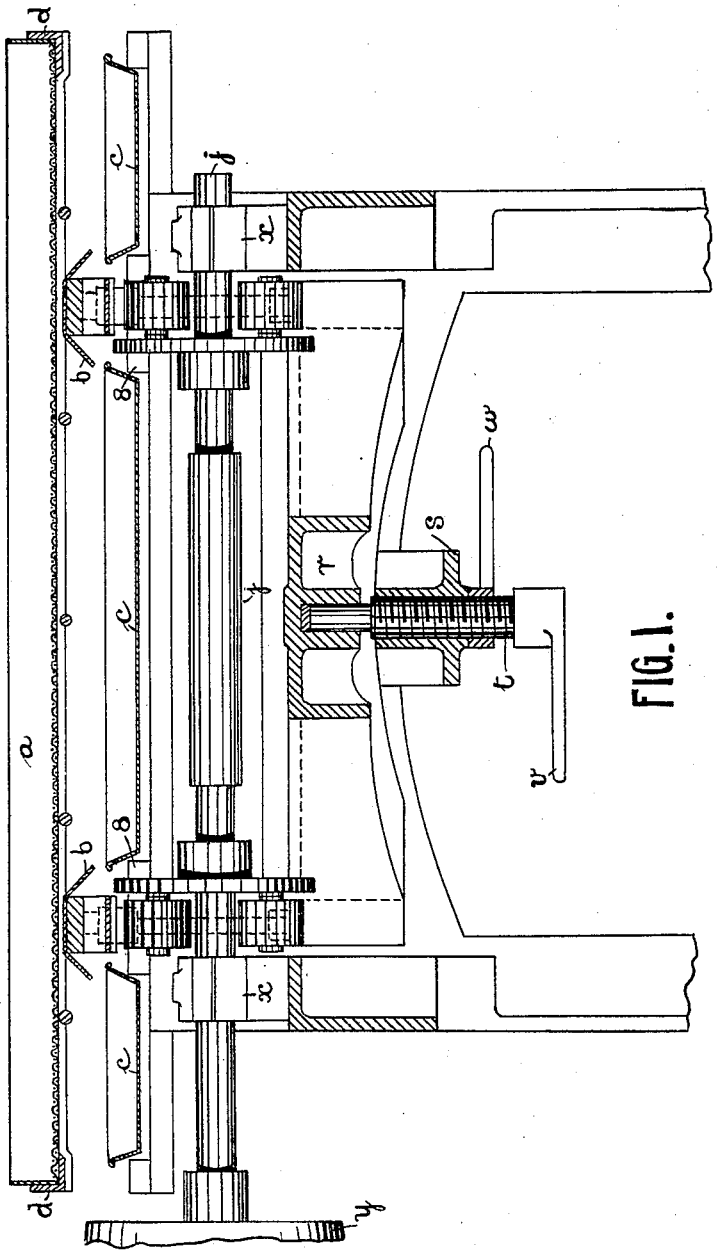
Figure 2:
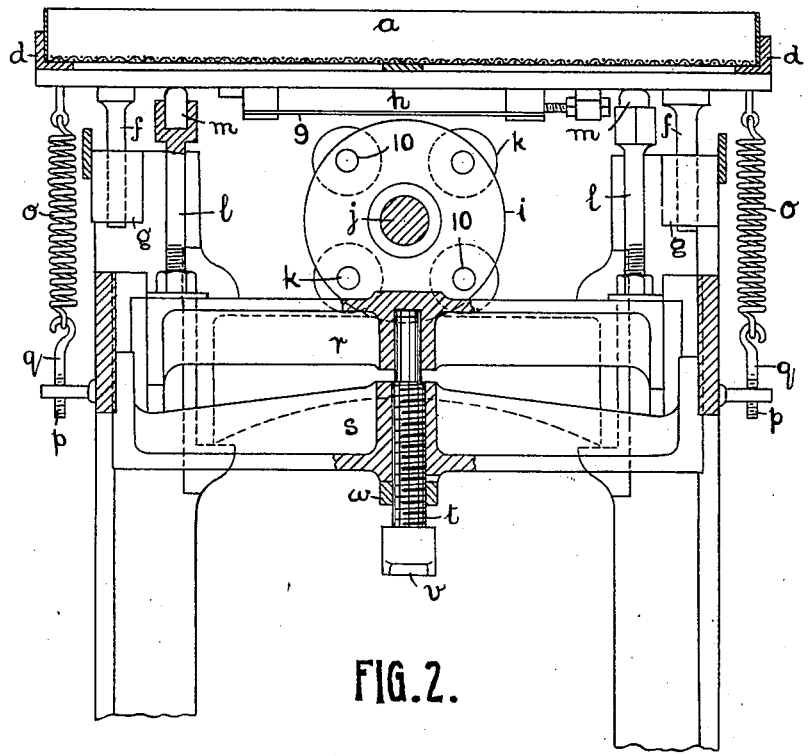
Figure 3:
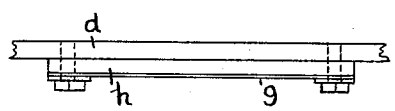
Figure 4:
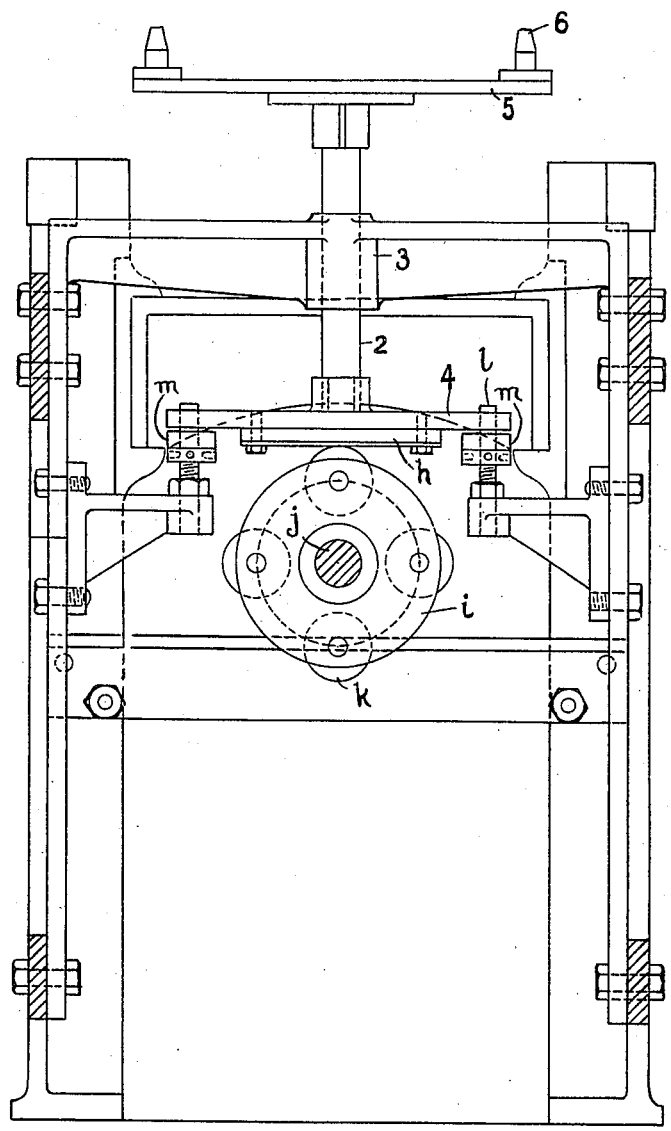

In the accompanying drawings, Figure 1 is a sectional elevation of my improved shaking-machine; Fig. 2, a sectional end view; Fig. 3, a detail view of one form of spring-abutment; Fig. 4, a sectional end view of the machine with a few slight alterations in construction.

Referring first to Figs. 1, 2, and 3, $a$ is a wirework or other pervious or somewhat elastic table or tray on which the molds with the chocolate are placed. Any small loose pieces of chocolate fall through the wirework $a$ and are collected in the trays $c$ below, $b$ being deflectors which guide the pieces of chocolate into trays $c$ where the trays are not continuous. The wirework of the table $a$ deadens the noise which would otherwise be made by the metallic molds dancing up and down with the shaking, and the trays $c$ rest on leather blocks 8. $d$ is a framework for the table on which the wirework $a$ is stretched, and there can be leather or other soft material inserted between the wirework $a$ and this framework $d$, which latter is supported in such a manner that it can be moved freely in a vertical direction, but is rigid horizontally. This can be done by forming it with stout projecting vertical legs $f$, sliding in vertical bearings $g$.

$h$ represents elastic or spring devices, each formed of a block of india-rubber or a pneumatic pad, fixed to the framework $d$ and carrying a steel plate 9 below.

$i$ represents cams on a horizontal shaft $j$ below the steel plates 9, provided with a suitable number of rollers $k$, revolving on pins 10. These cams moving against the aforesaid elastic or spring abutments $h$, attached to the lower face of the framework $d$ of the table $a$, impart to the table a vibrating or shaking movement in an upward and downward direction, the slight resilience of the india-rubber pad $h$ or pneumatic device preventing noise. In place of the pads $h$ and steel plates 9 a steel spring or flexible band of steel or other suitable springy pad or buffer can be fixed to the framework of the table, and in place of rollers $k$ the cams could be provided with beaks or the like, so as to strike the abutment, the latter giving slightly, and thus preventing noise, so that the table $a$ rises and falls as each roller $k$ or cam-beak passes the center line, and a shaking or vibrating motion is set up. It is obvious that there is no necessity for the springy pad or cushion, as the case may be, to be fixed to the framework of the table. It can be fixed to an oscillating or reciprocating arm, one end of which is connected with the table directly or by a link, which, if desirable, can be made adjustable in length by means of a right and left hand screw device or shackle. The entire weight of the table $a$ and its framework need not be carried by the shaking device, but can be supported on columns $l$, having india-rubber pads $m$ or the like fitted in sockets at their upper end. These columns are mounted on the cast-iron central bridge $r$ between the said frames $n$. By this arrangement the shaking device lifts the table from its supports $m$ as each roller $k$ passes the center line, and then the tray falls again onto its support either by gravity or, preferably, by means of springs $o$ in tension, one end of which are coupled to the framework of the table and the other end to a stem $q$, screwed into the fixed part $p$. The tension of the springs $o$ is adjustable by turning the stem $q$ one way or the other to elongate or slacken the spring $o$. The columns $l$, carrying the india-rubber supports $m$, are adjustable as regards height by mounting them in the cross-bridge $r$, sliding in guides between the main frames $n$ of the machine.

$s$ is a cross-frame fixed stationary in position between the frames $n$, and $t$ is a screw-shaft with a hand-lever $v$ at the lower end, this shaft being screwed through a hole in this fixed part $s$ and enters a hole in the sliding cross-bridge $r$. By turning the lever $v$ at end of the screw-shaft $t$, therefore, the cross-bridge $r$ is raised or lowered, as required, and can be locked in any position by the locking-lever $w$, thus rendering the columns $l$ adjustable as regards their height and increasing or reducing the amount of vibration imparted to the shaking-table.

$x$ represents the bearings in which the shaft $j$ is mounted, and $y$ a fragment of the pulley for driving that shaft.

In thus describing my experimental apparatus I do not bind myself to the exact arrangement herein specified, as having once given the general idea it is obvious that alterations can be made without departing from the nature of the invention. The shaking-table $a$ could, $e.$ $g.$, be mounted on one central shaft 2, which slides in the bearings 3. (Shown in Fig. 4.) At the lower end of this shaft is a plate 4, which rests upon the columns $l$, fitted with rubber pads $m$, the columns being adjustable in height by nuts. Below the plate 4 is a revolving cam $i$, whose rollers $k$ strike against the springy pad or abutment $h$, and so set up a vibration of the vertical shaft 2, on top of which is a bar-iron frame 5, with four pins 6, one at each corner. A movable wire table or tray is dropped onto this frame 5, four lugs on the movable tray fitting onto the four pins 6, thus holding it in position.

Where my invention differs especially from all shaking-machines known to me at the present time is, first, that there is a shaking device working in a vertical direction against a yielding material attached to the framework of the table $a$, and thus there is a direct up-and-down vibrating motion without the accompanying noise; secondly, there is a sound-deadening device for preventing the noise of the dancing metallic molds, which also incidentally acts as a means for carrying off broken chocolate without interfering with the chocolate in the molds, and, thirdly, the weight of the tray in its return motion is brought to rest by a cushion instead of striking a hard metallic stop, and consequently the revolving part of the shaking device can do its work without shocks, and each roller or beak of the cams rises to near its highest point before coming in contact with the abutments on the framework. By this means the action works with much greater ease to the machine than when the framework falls back direct onto the shaking device.

I declare that what I claim is—

1. A shaking-machine for shaking confectionery into molds, characterized by a pervious but somewhat elastic table (on which the molds are placed) mounted in such a manner that it can be moved freely in a vertical direction but is rigid horizontally, elastic pads or abutments attached to or connected with the under face of said table, and shaking devices working against said yielding abutments in such a manner as to set up a vertical vibration of the table without any accompanying noise.

2. In a shaking-machine for shaking confectionery into molds, a pervious and somewhat elastic table; a frame supporting said table; means for reciprocating said table vertically relative to said frame; supports on said frame adapted to support said table in its lowermost position; noise-deadening devices on said supports; yielding abutments on said table adapted to receive the impulses from the reciprocating means substantially as described.

3. In a shaking-machine for shaking confectionery into molds a pervious and somewhat elastic table; a frame supporting said table; means for vertically reciprocating said table relative to said frame; trays on said frame and under said table; deflectors between said table and said trays and over said reciprocating means; substantially as and for the purpose described.

4. In a shaking-machine for shaking confectionery into molds a table to receive the molds; rotating cam means; yielding abutments on said table, adapted to receive impulses from said rotating cam means; a frame supporting said table and carrying said cam means; springs in tension between said table and said frame; vertical guiding means for said table; supports adapted to receive said table in its lowermost positions; and means for adjusting the height of said supports substantially as and for the purpose described.

5. In a shaking-machine for shaking confectionery into molds a vertically-reciprocating table; a frame; guiding means between said table and said frame; a shaft horizontally mounted on said frame; cams on said shaft; rollers on said cams; yielding abutments on said table adapted to be struck by said cam-rollers; means for returning said table to its lowermost position, substantially as and for the purpose described.

6. In a shaking-machine for shaking confectionery into molds a frame; a table vertically guided on said frame; rotating cam means for raising said table; means for returning said table; means for limiting and adjusting the return movement of said table; means for holding said table out of contact with said cam means during certain periods of rotation of said cam means and in the lowermost position of said table; sound-deadening means on said table and on said limiting means substantially as described.

7. In a shaking-machine for shaking confectionery into molds in which a table mounted on a frame is reciprocated by cam means, sound-deadening means comprising a yielding abutment on the part of said table receiving the impulses from said cam means; means for adjusting said yielding abutments; supports on said frame; india-rubber pads on said supports; elastic supporting means in said table for the articles to be shaken substantially as and for the purpose described.

In witness whereof I have hereunto signed my name, this 21st day of September, 1903, in the presence of two subscribing witnesses.

BENJAMIN SEEBOHM ROWNTREE.

Witnesses:
ROBERT ERNEST HILL,
CHARLES DOWNEY.